United States Patent
Takaya et al.

(10) Patent No.: US 9,792,556 B2
(45) Date of Patent: Oct. 17, 2017

(54) MAPPING GATHERED LOCATION INFORMATION TO SHORT FORM PLACE NAMES USING CORRELATIONS AND CONFIDENCE MEASURES THAT PERTAIN TO LENGTHS OF OVERLAPS OF LOCATION DATA AND CALENDAR DATA SETS

(71) Applicant: SONY CORPORATION, Tokyo (JP)

(72) Inventors: Norifumi Takaya, San Diego, CA (US); Priyan Deveka Gunatilake, San Diego, CA (US); Guru Prashanth Balasubramanian, San Diego, CA (US)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 14/498,106

(22) Filed: Sep. 26, 2014

(65) Prior Publication Data

US 2016/0092785 A1 Mar. 31, 2016

(51) Int. Cl.
*G06F 15/18* (2006.01)
*G06N 7/00* (2006.01)

(52) U.S. Cl.
CPC .................................... *G06N 7/005* (2013.01)

(58) Field of Classification Search
CPC ....................... G06Q 10/1095; G06Q 10/1093
USPC ........................................................ 706/45, 12
See application file for complete search history.

(56) References Cited

U.S. PATENT DOCUMENTS

| | | | |
|---|---|---|---|
| 6,732,080 B1* | 5/2004 | Blants | G06Q 10/109 705/7.18 |
| 7,818,317 B1 | 10/2010 | Roskind | |
| 8,060,582 B2 | 11/2011 | Bliss | |
| 2008/0033778 A1* | 2/2008 | Boss | G06Q 10/109 705/7.18 |
| 2011/0119068 A1 | 5/2011 | Hockett et al. | |
| 2011/0227699 A1 | 9/2011 | Seth et al. | |
| 2014/0114571 A1* | 4/2014 | Coughlin | G01C 21/20 701/526 |

* cited by examiner

*Primary Examiner* — David Vincent
(74) *Attorney, Agent, or Firm* — John L. Rogitz (57) ABSTRACT

Using the short form information people tend to use in their calendar locations (not full address or GPS location), machine learning techniques are used to map gathered location information to these short form names.

8 Claims, 10 Drawing Sheets

Time Overlap

- Time overlap of an entry defined as the intersection between time values provided by corresponding calendar and location entries. Note that overlap is a value between [0 – 1.0].

MAPPING GATHERED LOCATION INFORMATION TO SHORT FORM PLACE NAMES USING CORRELATIONS AND CONFIDENCE MEASURES THAT PERTAIN TO LENGTHS OF OVERLAPS OF LOCATION DATA AND CALENDAR DATA SETS

FIELD OF THE INVENTION

The application relates generally to mapping gathered location information to short form place names.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other band, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem, that is pertinent here is a network of a particular user's devices. As understood herein, electronic calendars on mobile smart phone, while useful, location information provided in the calendar is often just the name of a conference room or short form for the name of a facility or even just a generic name (e.g., "the gym"). This information is very often unusable for determining the exact address or location of an event in a programmatic way. For example, if a user wished, to calculate the travel time to the location of a calendar event, the short form name of the location is not readily useful. Accordingly, as understood herein it would be advantageous to automatically map short form, location, names from a calendar event to the actual locations visited by the user to help a user know travel time to that next event location automatically without specific user input.

Accordingly, a device includes at least one non-transitory computer readable storage medium with, instructions executable by at least one processor to configure the processor for receiving geographic location information from at least one source of location information, receiving calendar information from at least one data storage, and correlating at least one calendar data set from the calendar information with at least first and second location data sets derived from the location information based at least in part on the first and second data sets temporally overlapping with the calendar data set to render first and second correlations. The instructions when executed by the processor configure the processor for associating the first and second correlations with respective first and second confidence measures. Each confidence measure is based at least in part on a length of temporal overlap between the respective location data set and the calendar data set. The instructions when executed by the processor configure the processor for selecting one of the correlations based at least in part on a relationship between respective confidence measures, and outputting user information associated with the calendar data set and the location data set associated with the correlation selected based at least in part on the confidence measures.

In some examples, the instructions when executed by the at least one processor configure the processor for determining a confidence measure based at least in part on a length of temporal overlap between the respective location data set and the calendar data set and a number of times the respective correlation has been recorded in temporally discontinuous recordings. In some examples the instructions when executed by the at least one processor configure the processor for selecting the first correlation based at least in part on the first confidence measure being greater than the second confidence measure.

The source of location information can be a location data set storage. The location data set storage can include geographically determinate names correlated to GPS locations. The user information, may include an electronic map showing a geographic location of a place in the calendar data set. The calendar data set need not include the geographic location. Alternatively or in addition the user information may include alpha-numeric driving directions to a place in the calendar data set. A calendar data set may include a start time, an end time, and a geographically indeterminate place name.

In another aspect, a method includes accessing geographically indeterminate calendar information, and accessing geographically determinate location information. The method includes associating, with a name from the calendar information, a location from the geographically determinate location information based on a number of temporally disjoint times the location has temporally overlapped the name from the calendar information. The method also includes outputting user information related to a calendar event involving the name from the calendar information and including an indication of the location.

In another aspect, a device includes at least one computer memory bearing instructions and at least one processor configured for accessing the memory to execute the instructions to configure the processor to determine whether a temporal overlap exists between a calendar data set in an electronic calendar and a location data set in a location data set storage. The instructions when executed, by the processor configure the processor to, for each location data set temporally overlapping with the calendar data set, determine a number of times the location data set temporally overlaps with the calendar data set. The instructions when executed by the processor configure the processor to return as a correlation with the calendar data set the location data set whose number of times of overlap with the calendar data set and at least one period of overlap with the calendar data set is superior to any other location data set in the location data set storage.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional, general purpose single- or multi-chip processor that can execute logic by means of various lines such as address lines, data lines, and control lines and registers and shift registers.

Software modules described by way of the flow charts and user interfaces herein, can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which, may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerised Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled bead phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
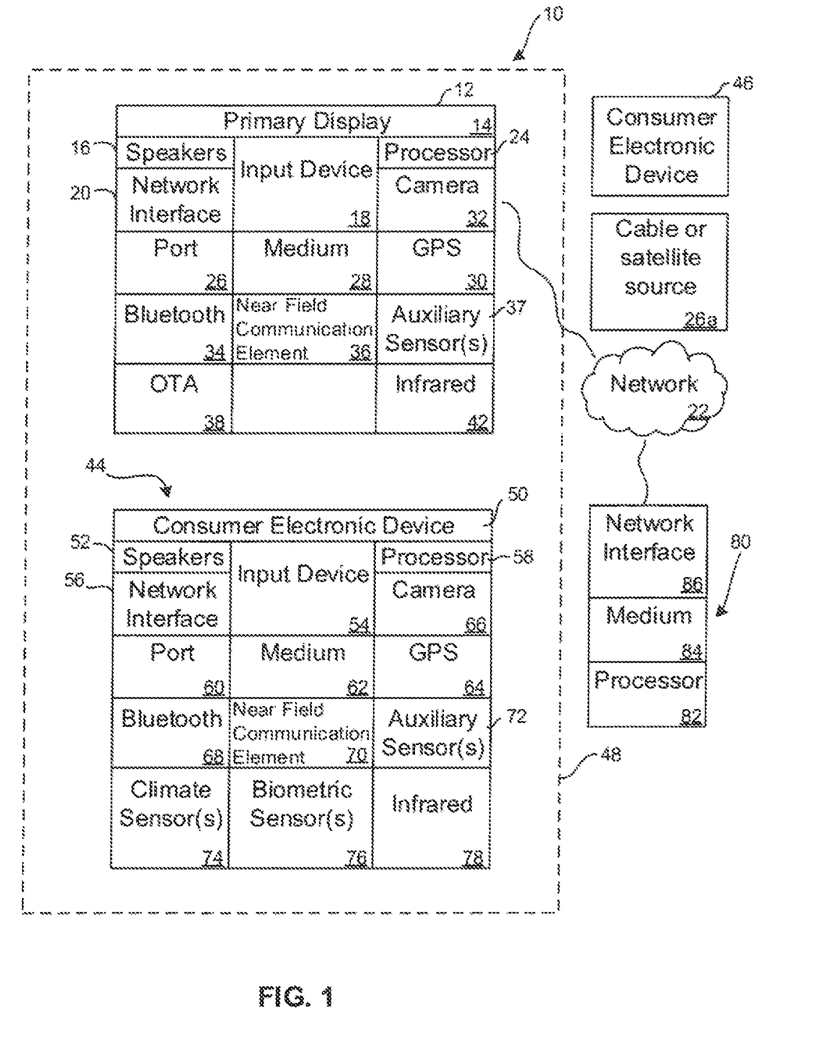
FIG. 1 is a block diagram of art example system including an example in accordance with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that, may be touch-enabled for receiving user input signals via touches on the display. The AVDD 12 may include one or more speakers 16 for outpacing audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interlace, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through, the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more tangible computer readable storage medium 28 such, as disk-based or solid state storage, in some cases embodied in the chassis of the AVDD as standalone devices or as a personal video recording device (PVR) or video disk player either internal or external, to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which, the AVDD 12 is disposed in conjunction with, the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description, of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/Images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24, in addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as tire first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interlace 56 may be, without limitation, a Wi-Fi transceiver, which is an example of a wireless computer network interface, including mesh network interfaces, it is to be understood mat the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with, present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with, the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

In the logic below, components of the one or more of the CE devices described above may be built into a vehicle, or the CE device(s) may be hand-carried in vehicles, or a combination of band-carried and built-in devices may be used. For example, the engine control module (ECM) of a vehicle may implement logic herein to present on a built-in display information divulged herein. Input of location may be from a built-in GPS sensor in the vehicle or from the GPS sensor of a hand-held CE device wirelessly communicating with the ECM, e.g., via Bluetooth. Calendar information including short place names may be automatically transferred from a hand-held CE device to the ECM, or the hand-held CE device may entirely perform the logic, accessing a calendar data structure internal to it. Or, a user may manually enter calendar information or select to have such information transferred from a CE device storing the information to a CE device executing the logic. The transfer may be wireless, e.g., via Bluetooth, WiFi, or other protocol, or it may be wired, it may be transferred through the Internet, on a thumb drive, etc.

Figure 2:
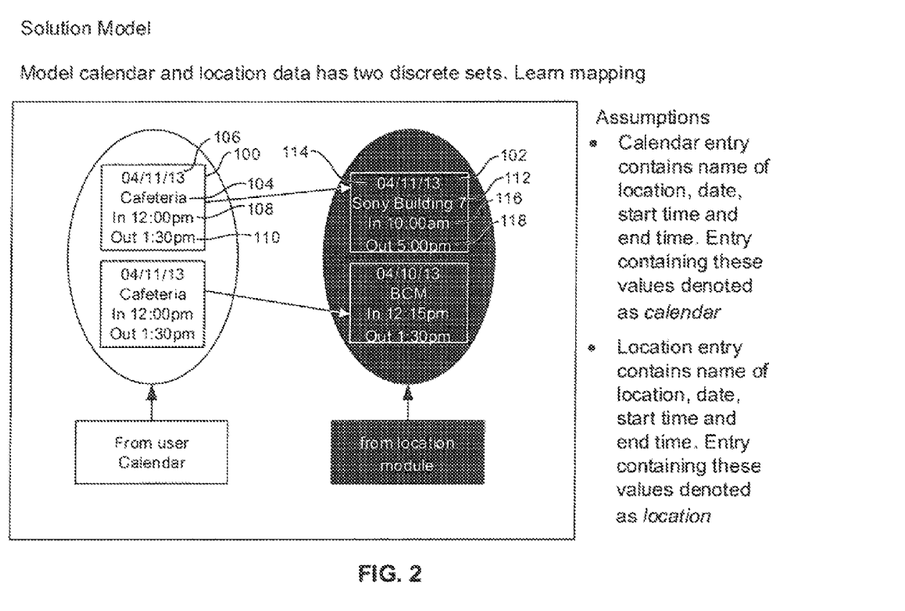
FIG. 2 is an example schematic diagram of the calendar set and location set.

Now referring to FIG. 2, two example calendar data sets 100 are shown correlated to two respective location data sets 102. Each calendar data set 100 preferably includes a name 104, generally indeterminate of absolute geographic location (e.g., "cafeteria"), a date 106, and start and end times 108, 110. Each location data set 102 preferably includes a name 112, generally indicative of absolute geographic location (e.g., "Sony San Diego Building 7"), a date 114, and start and end times 116, 118. The location name 112 may alternatively be a latitude and longitude or other index indicative of absolute geographic location, but in the example shown it is a geographic place name. This is because certain outputs discussed below are more user-friendly and recognizable when expressed as place names rather than latitudes and longitudes. It is to be understood that location names 112 may be derived by receiving GPS information from a GPS receiver such as the receiver 30 or 64 shown in FIG. 1 and then automatically using the GPS data as entering information to an electronic map in which, e.g., place names are correlated to latitudes and longitudes.

Present principles are directed to correlating entries in the calendar set with entries in the location set, so that when a user enters the (typically informal) calendar entry for a future event, the entry is automatically correlated to a geographic name and certain reminders and outputs may be produced such as alerting a user of an impending calendar event and then employing the location information to give the user driving directions, travel time estimates, and so on.

As discussed further below, temporal overlaps between calendar events and location data sets are used to train a machine learning model to make correlations between calendar names and location data sets. Over time the machine learning model becomes better at knowing the exact locations of the names in the calendar.

For example, if the name in a calendar data set is "conference room xyz" and during the time a user's GPS-derived information (from, e.g., the user's smart phone) indicates geographic a work office location, the probability of the "conference room xyz" being at the geographic work location increases. Likewise if whenever the user is schedule to be at the "gym" in the calendar data set and very often the user's smart phone GPS indicates a specific location (e.g. at John's gym on 1st Avenue in Los Angeles), the model predicts that future calendar events for "gym" require the user to be present at John's gym on 1st Avenue. Subsequently, the user's calendar schedule, typically stored in the user's smart phone, is accessed and correlated to location data set(s) to alert the user when it is time to leave for a calendar event or to inform the user that be will be late to the event, etc.

Note that while certain examples refer to "smart phone", present principles apply to any appropriate CE device, typically a portable CE device the user carries such, as smart, phones, notebook or notepad computers, personal digital assistants, etc.

Thus, present principles map an entry from a calendar data set containing place, time and donation attributes to a point from a location data set containing a location tag such as a name, and also containing time and duration attributes. Moreover, present, principles in some examples quantity each mapping with a measure to indicate confidence in its mapping.

As understood herein, two primary sources of errors may arise in <calendar,location> pairs from system. The first are correlation errors due to two potential location data sets that are near one another, such as when two nearby locations both, having cafeterias are mapped to a calendar data set with a name of "cafeteria". Also, calendar errors can occur, in which the name of a calendar data set does not correspond to the user's actual location such as may occur when a user deviates from the calendar schedule without updating the calendar.

Accordingly, as described further below present principles assign a confidence measure for each <calendar, location> data pair that reflects the reliability of the correlation. This allows learning to be driven by reliable data, (high confidence) and minimizes the impact of suspect data (low confidence).

A confidence measure can be defined based on time overlap and past history. The confidence increases when the time overlap between, calendar and location entries increases. Also, the confidence increases when (<calendar, location>) pairs repeat.

Figure 3:
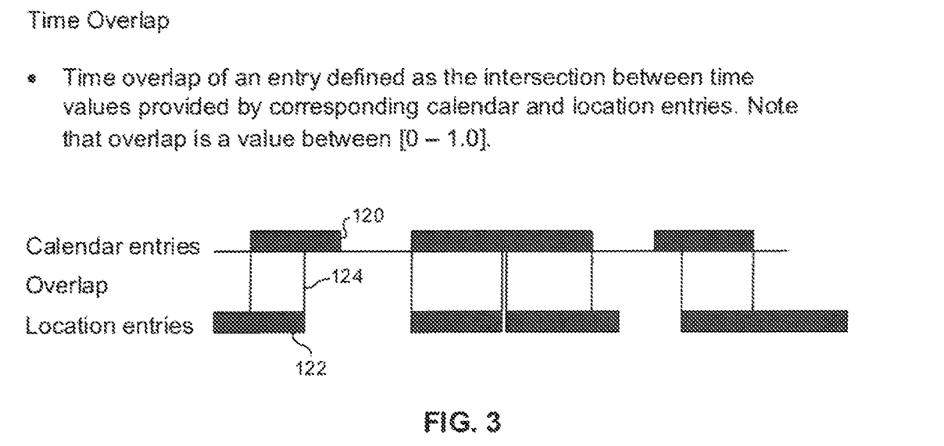
FIG. 3 is an example schematic diagram illustrating temporal overlap between calendar and location entries.

FIG. 3 illustrates time (temporal) overlap between calendar data sets and location data sets derived from observed geographic locations (e.g., from GPS data). As shown, calendar entries 120 are shown at the top of the diagram, observed location data sets 122 are shown at the bottom, and time bars 124 are shown therebetween indicating the overlap between the data sets. In other words, the time bars 124 indicate the intersection between time values provided by corresponding calendar and location entries. Programmatically the overlap may have a numerical value of between 0 and 1.0. The length along the x-axis of each bar in the diagram corresponds to the length of time of the underlying element. The greater the length of the temporal overlap 124 between a calendar data set 120 and a location data set 122, the greater the confidence measure will be for the correlation between those two data sets.

Figure 4:
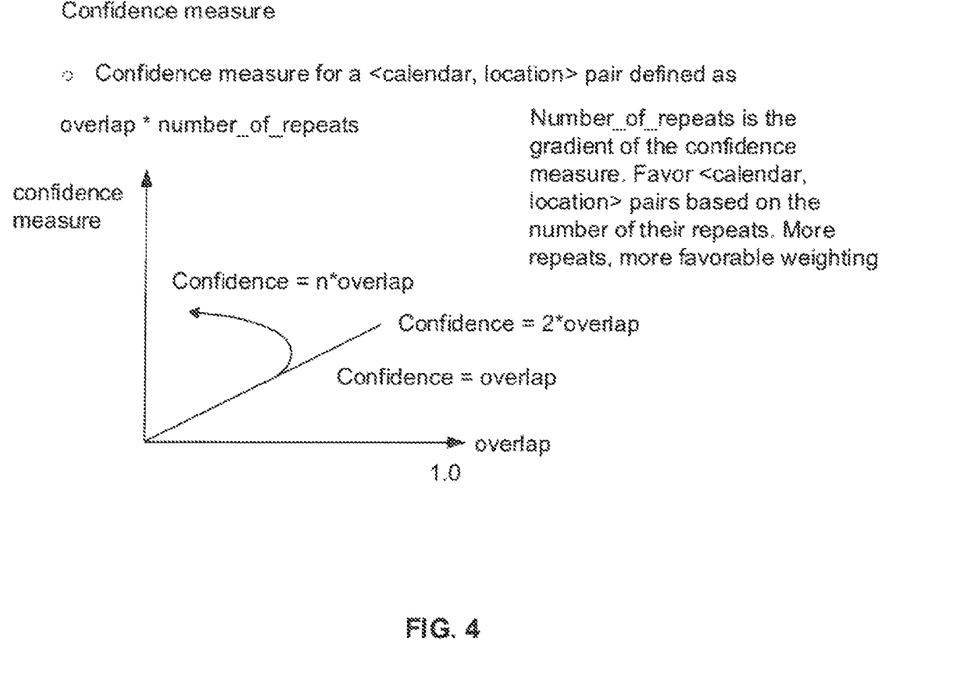
FIG. 4 is an example graph showing confidence measure as a function of overlap between calendar and location entries.

FIG. 4 illustrates confidence measure increasing as the number of repeats between a calendar data set and a location set increases. In FIG. 4 the temporal overlap between a pair is shown on the x-axis and confidence measure on the y-axis. As shown, confidence increases linearly with temporal overlap when a single instance of a calendar data set/location data set is established. When two separate instances of temporal overlap between the same pair occurs, the confidence measure is multiple by two. When "n" two separate instances of temporal overlap between the same pair occurs, the confidence measure is multiple by "n", wherein "n" is an integer. Thus for example, a single instance of temporal overlap between a pair of calendar data set/location data set yields a confidence that the pairing is correct of one-half of the confidence the pairing is correct if the same temporal overlap between the pair occurs twice.

Figure 5:
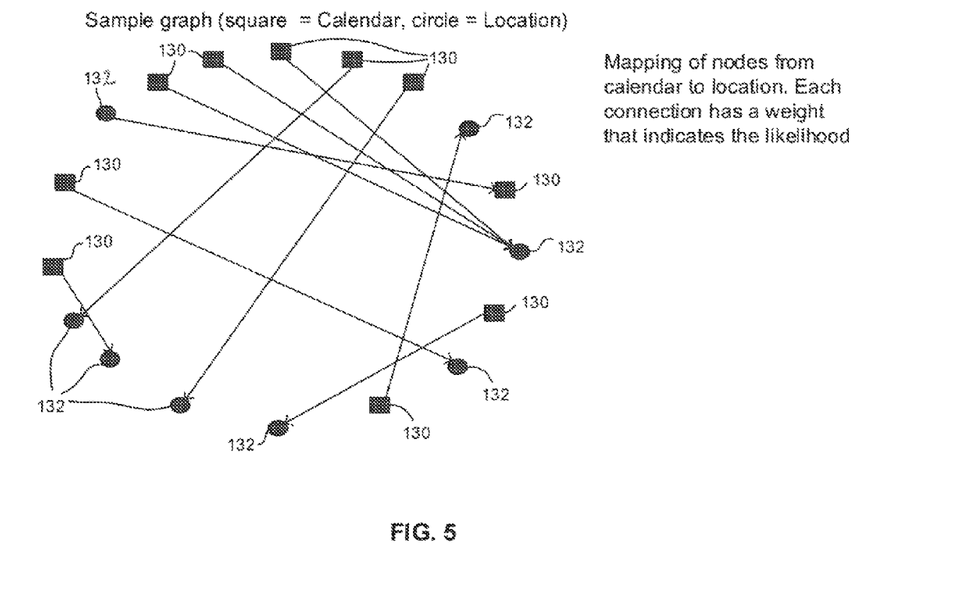
FIG. 5 is an example edge graph showing connections between calendar and location entries.

The above pairing may be modeled as an acyclic directed graph structure (FIG. 5) with calendar data sets 130 and location data sets 132 modeled as nodes on the graph. Connections 134 between pairs are modeled as edges. The connection strength can be modeled as the sum of the confidence measures. The correct mapping between a calendar/location data set pair is learned when P (true location tag)>P (other location tags), wherein P is a probability as indicated by the confidence measure.

Figure 6:
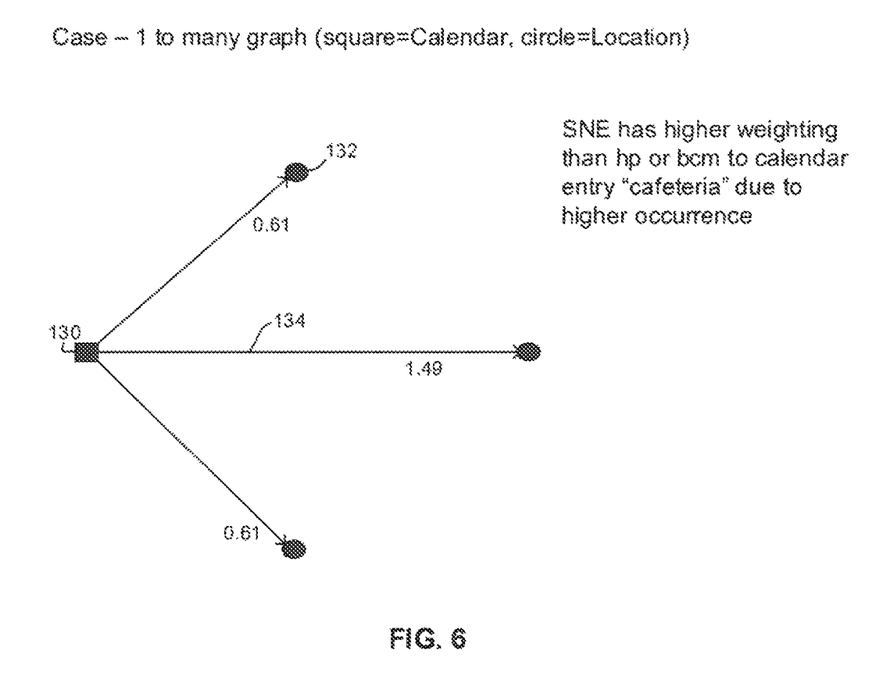
FIG. 6 is an example graph showing a one-to-many relation among calendar and location entries.

FIG. 6 illustrates a one-to-many correlation between a single calendar data set 130 and multiple potential location data sets 132. As shown, confidence measures of 0.61 are indicated on the edges 134 between the calendar data set 130 and the upper and lower location data sets 132, whereas a confidence of measure of 1.49 is indicated on the edge 134 between the calendar data set 130 and the middle location data set 132. The length of the edges 134 cart be linearly proportional to the magnitude of the corresponding confidence measure, in the example of FIG. 6, the pairing between the calendar data set 130 and the middle location data set 132 would be selected as the correct pairing because the corresponding confidence measure is greater than the other confidence measures of the remaining potential location data sets.

An example application specific interface (API) to implement principles above may be as follows:

```
CLocMap getInstance( ) - get instance of map
bool regConnection(String calName, String locName, double overlap)
bool unregConnection(String calName, String locName)
bool clearConnection(String calName, String locName)
bool removeCalendarNode(String calName)
bool removePOINode(String locName)
void clearGraph( );
List<Map.Entry<String,Double>> getMapping(String calName)
bool load( )
bool save( )
```

Figure 7:
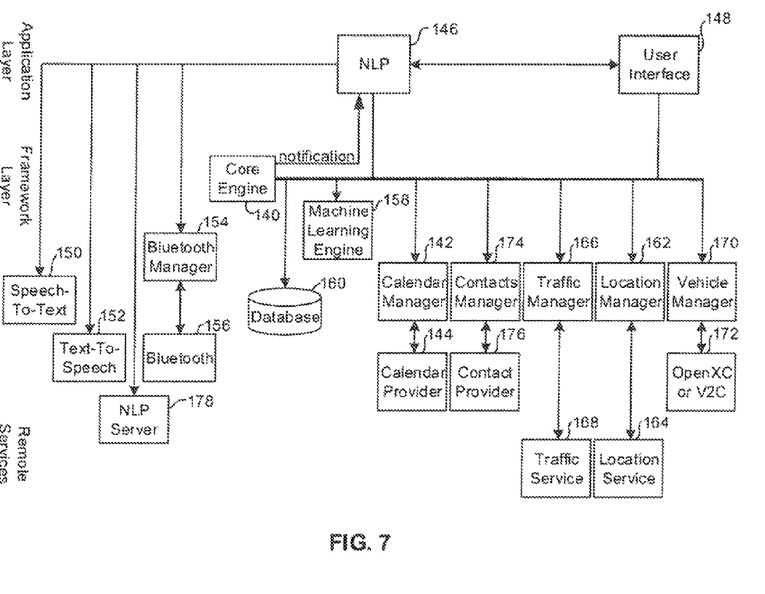
FIG. 7 is a block diagram of an example specific hardware/software architecture that may be used.

FIG. 7 illustrates an example architecture that may be implemented in part by a CE device such as any of those in FIG. 1 in consonance with remote service such as may be hosted by the server 80 to undertake present principles. The blocks in FIG. 7 may be implemented by hardware and/or software and/or a combination thereof.

A core engine 140 at a framework layer accessing a calendar manager 142 to receive calendar information from a calendar provider 144, typically a user-entered database of calendar data sets as described above, provides notifications of upcoming events and alerts to a neuro-linguistic programming (NLP) component 146 at an application layer. The NLP component 146 drives a user interface component 148, also at the application layer. The UI component 148 may present audio and/or video output. The NLP component 146 may communicate with a speech-to-text converter 150 at the framework level to produce text alerts. The NLP component 146 may communicate with a text-to-speech converter 152 at the framework level to produce audio alerts. Communication may be provided through a Bluetooth manage 154 controlling a Bluetooth transceiver 156.

As shown, the core engine 140 may access a machine learning engine 158 that implements the principles above to establish correlations based on confidence measures between calendar data sets and location data sets. A database 160 may be provided to store necessary code instructions, data, etc. In addition to the calendar manager 142, the core engine 140 typically accesses a location manager 162 which provides location data sets that may be stored in the database 160. The location manager 162 receives location information from a location service 164, shown in FIG. 7 to be a remote service but potentially a GPS receiver onboard the CE device. The correlation between GPS coordinates and location geographic names may be implemented by the service 164 and/or the location manager 162.

To provide for detailed alerts of travel, information pertaining to upcoming calendar events whose data sets have been correlated to locations, the core engine 140 may access a traffic manager 166 that receives traffic information from a remote traffic service 168 and vehicle information (such as fuel remaining, etc.) from a vehicle manager 170 accessing a vehicle information source 172 such as a vehicle's engine control module (ECM). A contacts manager 174 may also be accessed by the core engine 140 to correlate contacts and their location information to calendar entries. The contacts manager 174 may receive contact information from a contact provider 176 such as a list of contacts contained in the CE device. The NLP component 146 may receive programming and data from a remote NLP server 178.

The core engine 140 can determine when to notify or alert the user about upcoming calendar events. Example audio and/or video alerts that the core engine may cause to be presented on, e.g., the user's CE device may include "busy day", based on the number of calendar events for that day exceeding a predetermined number. Other example alerts in the vehicle application context can include "running late", based on noting a calendar event, accessing the corresponding location data set and determining, based on traffic data, that an estimated drive time between the user's current location and the calendar event location exceeds the period between the present time and the start time of the calendar event data set. Another vehicle example alert may be generated that informs a user to refuel by noting the distance between a current user location and a calendar location and accessing fuel tank information from the vehicle manager 170 indicating that the amount of fuel is less than needed to cover the distance. Other example alerts may be provided, and the user may be given the option of suppressing further alerts using, e.g., a UI on the CE device.

Figure 8:
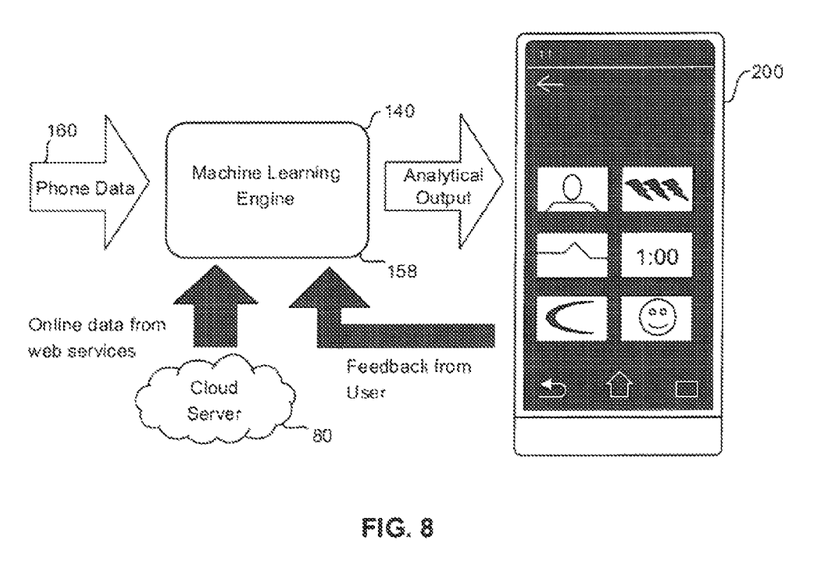
FIG. 8 is an example diagram illustrating data input and output principles.

FIG. 8 illustrates a more generalized view of the architecture in FIG. 7 in which the core engine 140/machine learning engine 158 receives calendar and location data from a smart phone database 160 as well as information from one or more cloud servers 80 to output analysis on a UI 200 driven by the UI component 148 of FIG. 7. Note that the UI 200 may be a touch screen display on the smart phone housing the database 160 and engine 140/158. User feedback from the UI 200 may be provided to the engines described herein.

Figure 9:
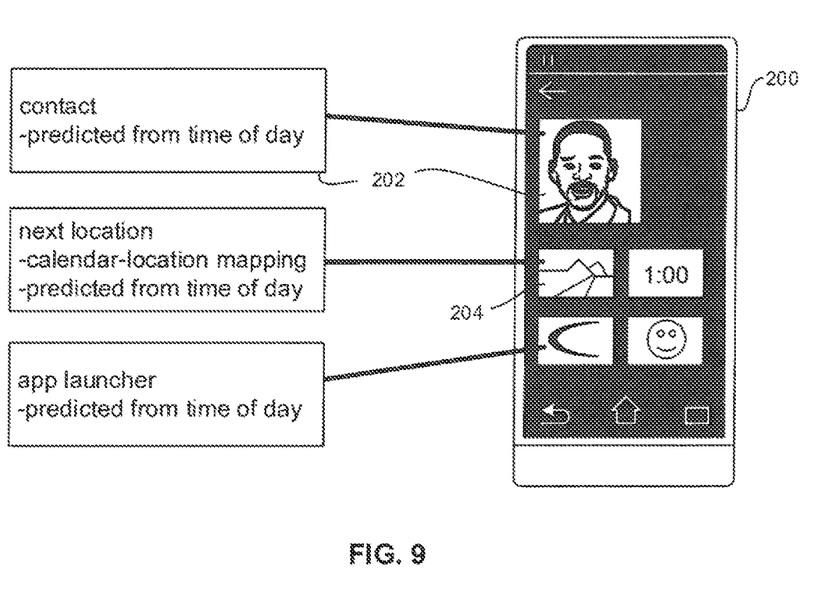
FIG. 9 is a screen shot of an example user interlace (UI)

FIG. 9 shows an example UI 200 as presented on the touch screen of a smart phone CE device. The engine 140 has looked ahead N hours into the calendar database and has noted a meeting with a contact from, the contact database at a future time of the present day, presenting at 202 a reminder along with the contact's photo. At 204 the UI presents an image such as a photograph of the next calendar location by looking up the location using the calendar data set and, e.g., downloading a photo of the location by place name (e.g., "Sony Building 7") from an Internet database. A map to the location may also be presented. A predicted future time for launching an application on the CE device may also be presented at 206.

Figure 10:
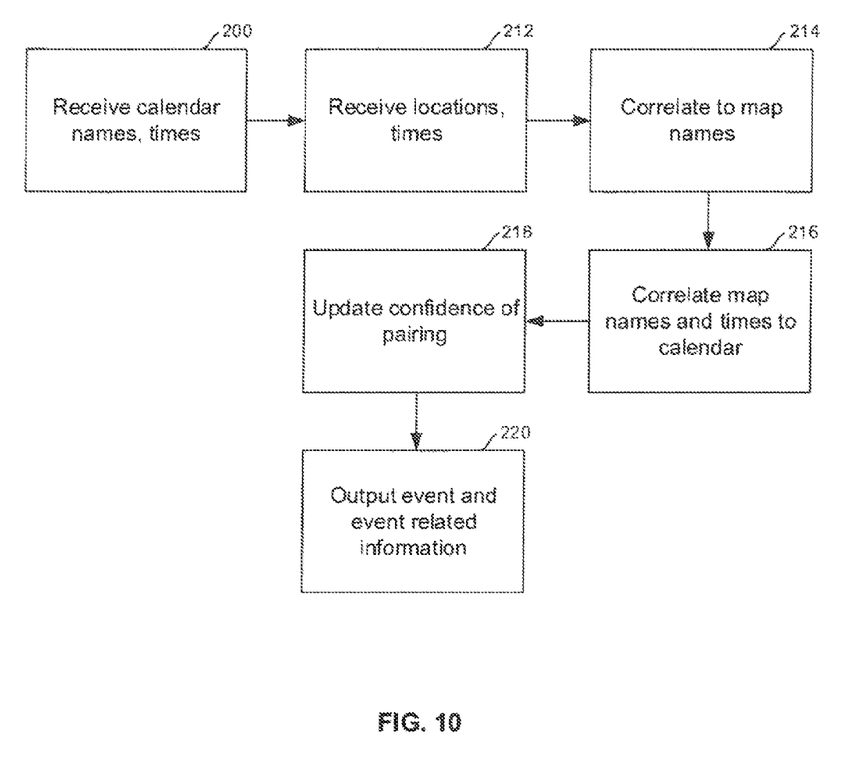
FIG. 10 is a flow chart of example logic according to present principles.

FIG. 10 illustrates example logic according to principles discussed above. At block 210 calendar data sets are received and at block 212 location data sets are received, e.g., from a GPS receiver with timestamps indicating the start and end times at which the device holding the GPS receiver was located. At block 214, if the locations are received as GPS coordinates, they may be correlated to place names by accessing a map using the GPS coordinates as entering argument and obtaining the corresponding place names from the map.

Moving to block 216, each calendar data set is correlated to one or more of the location data sets whose period between the start and end time at least partially overlaps the period between the start and end times of the calendar data set. Thus, as described above, each calendar data set may initially be correlated to plural location data sets.

Proceeding to block 218, for each calendar data set-location data set pair which has been correlated on the basis of at least partial temporal overlap, a confidence measure is assigned. In one example, a confidence measure of between 0 and 1.0 is assigned in direct proportion to an overlap period length of between 0 and N minutes, wherein N is an integer and overlap periods in excess of N minutes are assigned the maximum confidence measure. Other confidence measure scales may be used. In other embodiments the overlap period may be broken into equal segments of M minutes each, with an overlap period of a minimum number of segments or less being assigned a low confidence measure, an overlap period of more than the minimum number of segments but less than a first number of segments being assigned a medium low confidence measure. An overlap period of more than the first number of segments but less than a second number of segments may be assigned a medium confidence measure, an overlap period of more than the second number of segments but less than a third number of segments may be assigned a medium-high confidence measure, and an overlap period of more than the third number of segments may be assigned a high confidence measure. Thus, the confidence measure may be quantized by number of segments in the overlap period. The confidence measures of low, medium low, etc., may be numerical as described above.

Any parings between calendar data sets and location data sets, including one-to-many pairings described above owing to multiple location data sets overlapping with a single calendar event, are stored, and the confidence measure described above that is based on length of overlap period may be modified based on the number of discrete, temporally discontinuous times a pairing has been stored. For example, assume calendar data set A has been associated with location data set B based on overlapping periods of the data sets on Tuesday and stored as an association, and the same data set pairing is observed several hours later on Wednesday, in such a case, the number of times the pairing has been made may be denoted by the integer "L", and the confidence measure of any calendar data set-location data set pair may be multiplied by "L" as the final confidence measure. Other ways to mathematically combine with the confidence measure may be used, e.g., the confidence measure may be multiplied by the logarithm of L, or added to L, or added to a trigonometric function of L, etc.

In any case, events and event-related information based on the automatically correlated locations of the events can be output at block 220 using the confidence measures. For example, no event information (other than the existence of an upcoming calendar event) may be output responsive to a determination that no confidence measure related to any location data set pairing with that calendar data set satisfies a minimum threshold. When two or more confidence measures satisfy the threshold, the location data set producing the highest confidence measure for the calendar data set being considered is used as the location of the calendar event, with event information output accordingly in keeping with description above.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be downloaded in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A device comprising:
at least one non-transitory computer readable storage medium with instructions executable by at least one processor to configure the processor for:
receiving geographic location information from at least one source of location information;
receiving calendar information from at least one data storage;
correlating at least one calendar data set from the calendar information with at least first and second location data sets derived from the location information based at least in part on the first and second data sets temporally overlapping with the calendar data set to render first and second correlations;
associating the first and second correlations with respective first and second confidence measures, each confidence measure being based at least in part on a length of temporal overlap between the respective location data set and the calendar data set;
selecting one of the correlations based at least in part on a relationship between respective confidence measures; and
outputting human-perceptible user information associated with the calendar data set and the location data set associated with the correlation selected based at least in part on the confidence measures.

2. The device of claim 1, wherein the instructions when executed by the at least one processor configure the processor for:
determining a confidence measure based at least in part on a length of temporal overlap between the respective location data set and the calendar data set and a number of times the respective correlation has been recorded in temporally discontinuous recordings.

3. The device of claim 1, wherein the instructions when executed by the at least one processor configure the processor for:
selecting the first correlation based at least in part on the first confidence measure being greater than the second confidence measure.

4. The device of claim 1, wherein the source of location information is a location data set storage.

5. The device of claim 4, wherein the location data set storage includes geographically determinate names correlated to GPS locations.

6. The device of claim 1, wherein the user information includes an electronic map showing a geographic location of a place in the calendar data set, the calendar data set not including the geographic location.

7. The device of claim 1, wherein the user information includes alpha-numeric driving directions to a place in the calendar data set, the calendar data set not including the geographic location.

8. The device of claim 1, wherein the calendar data set includes a start time, an end time, and a geographically indeterminate place name.

* * * * *